United States Patent [19]
Wilson

[11] Patent Number: 5,089,757
[45] Date of Patent: Feb. 18, 1992

[54] SYNCHRONOUS DIGITAL DETECTION OF POSITION ERROR SIGNAL

[75] Inventor: Rosser S. Wilson, Menlo Park, Calif.
[73] Assignee: Maxtor Corporation, San Jose, Calif.
[21] Appl. No.: 669,757
[22] Filed: Mar. 15, 1991
[51] Int. Cl.[5] .............................................. G11B 5/55
[52] U.S. Cl. .................................... 318/560; 318/561; 360/77.02; 360/77.04; 360/77.08; 369/44.11
[58] Field of Search ................................ 318/560-630; 360/73.12, 73.13, 77.01-77.14, 78.01, 36.1, 38.1; 369/43-46

[56] References Cited

U.S. PATENT DOCUMENTS

| | | | |
|---|---|---|---|
| 3,427,606 | 2/1969 | Black et al. | 360/77.11 |
| 4,397,010 | 8/1983 | Nabeshima | 360/77.06 X |
| 4,748,608 | 5/1988 | Matsumoto et al. | 360/77.07 X |
| 4,757,394 | 7/1988 | Okamoto et al. | 360/77.02 X |
| 4,831,471 | 5/1989 | Tsujisawa | 360/77.04 X |

*Primary Examiner*—Paul Ip
*Attorney, Agent, or Firm*—Hecker & Harriman

[57] ABSTRACT

A sample data position error signal detection means. This invention has application in a digital servo in a magnetic media disk drive environment. In particular, the invention relates to the detection in digital form of position error signals (PES) representative of magnitude and sign of recording head displacement from a track center line. The circuits disclosed provide a digital representation of PES suitable for direct application to a digital signal processor which controls overall servo positioning operations. The invention detects the PES by employing a digital integrator which comprises a register and adder. The composite servo data is first amplified by variable gain amplifier and then undergoes low pass filtering before being digitized by an analog to digital converter (ADC). The digital integration is performed by accumulating a constant number of ADC samples in the register. Before being accumulated in the register, the sampled servo data is alternately multiplied by plus or minus one, using an exclusive-OR gate cascade interposed between the ADC output and adder input. The multiplication of the sampled servo data by plus one or minus one is required for synchronous rectification. Upon completion of accumulation of a prescribed number of ADC samples, the contents of the register are transferred to a temporary buffer pending interrogation by the servo controlled digital signal processor.

8 Claims, 6 Drawing Sheets

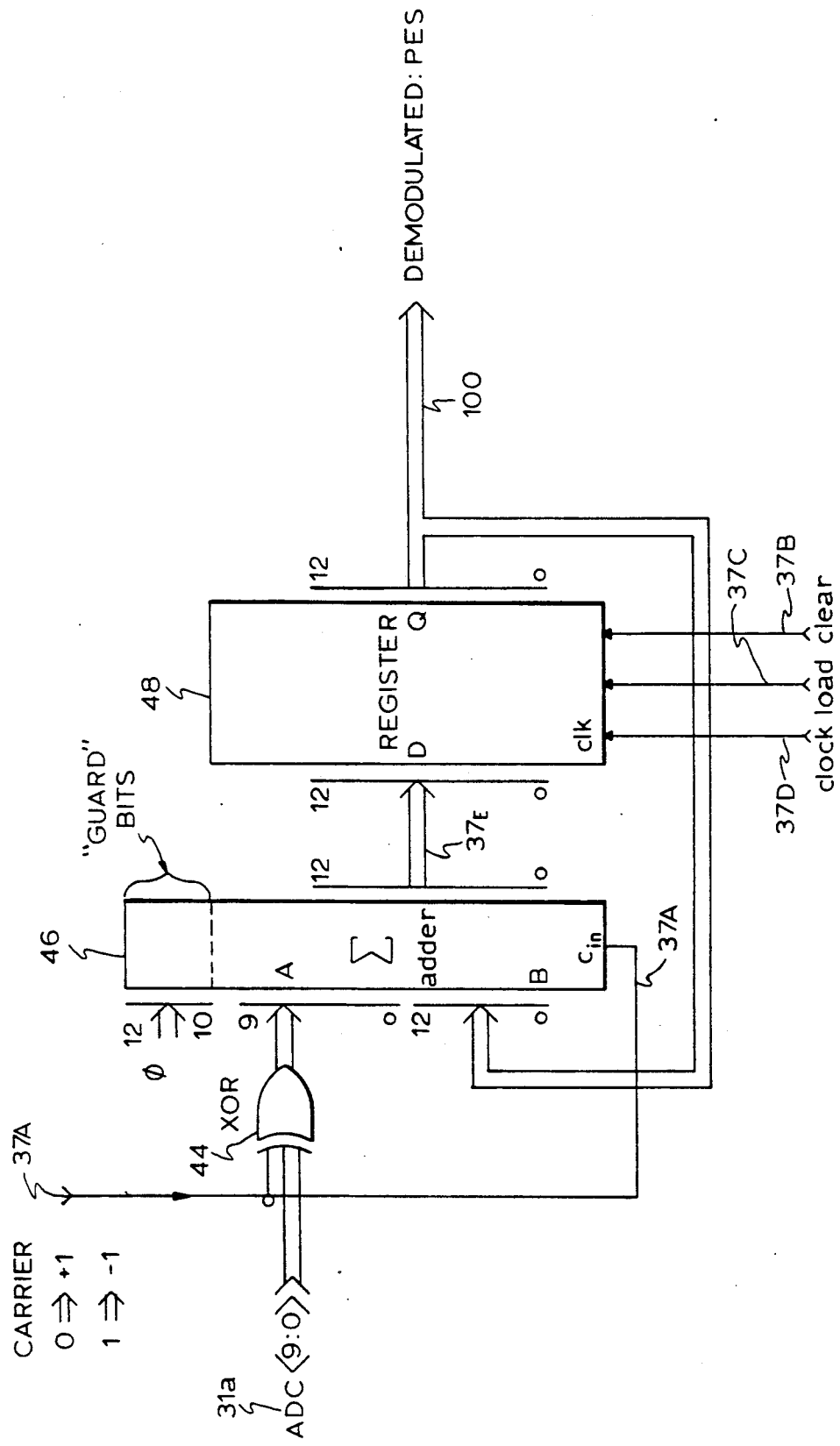

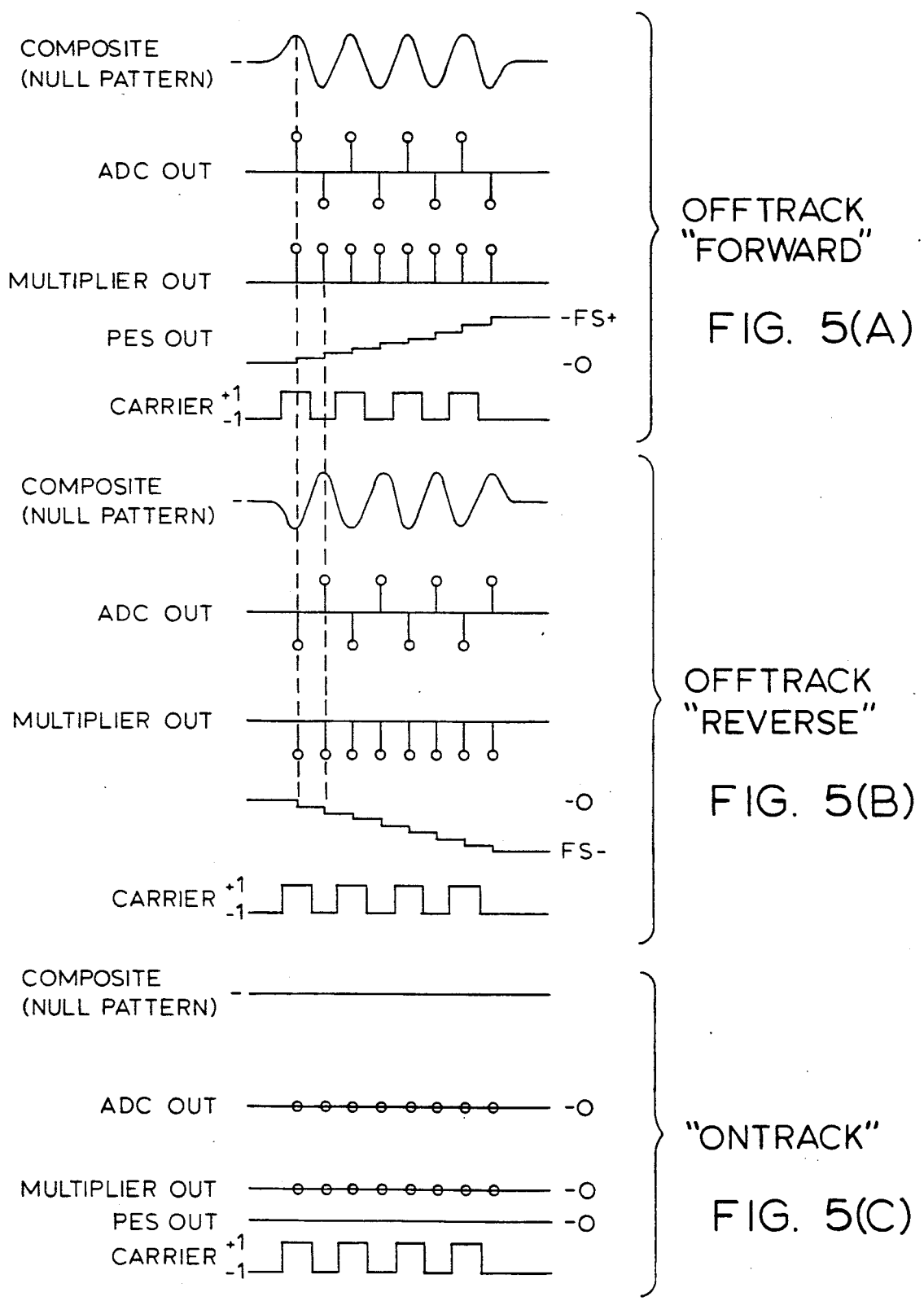

SYNCHRONOUS DIGITAL DETECTION OF POSITION ERROR SIGNAL

BACKGROUND OF THE PRESENT INVENTION

1. Field of the Invention

This invention relates to the field of position error signal detection in magnetic recording disk files.

2. Background Art

In a typical rotating medium storage system, data is stored on magnetic or magneto optic disks in a series of concentric or spiral "tracks." These tracks are accessed by a read/write head that detects variations in a magnetic orientation of the disk surface. The read/write head moves back and forth radially on the disk under control of a head positioning servo mechanism so that it can be positioned over a selected track. Once in position over a track, the servo mechanism causes the head to trace a path which follows the center line of the selected track. This maximizes head-to-track registration, and permits accurate recording and reproduction of data on the track.

In the prior art, position information is provided through the use of special servo patterns that are reproduced by the recording heads in the drive. A servo pattern is a permanent pattern pre-recorded on the storage disk at the time of assembly of the completed disk drive. The servo pattern is detected by the head, and after appropriate signal processing, yields track position information. There are a number of methods of providing servo data in a disk drive, including "dedicated" servo, "buried" servo and "sector" servo.

In a dedicated servo scheme, one entire surface of a disk contains servo information. A servo head accesses the servo surface or the servo disk to read the position information stored therein. The servo head is in a fixed relationship relative to the read/write heads, so that the position of the servo head can be used to indicate the position of the read/write heads. A dedicated servo scheme is often used in disk drives having multiple disks. In a single disk system, a dedicated servo scheme is not practical, since 50% of the available storage area (one surface of the two sided disk) is unavailable for data storage. The disk surface area which is dedicated to servo tracks cannot be used for data tracks.

One method of increasing available space for data tracks is to "bury" the servo layer beneath the surface of the data disk itself. There are, however, several disadvantages associated with using prior art buried servo schemes, including diminished tracking accuracy.

In the sector servo method, bursts of servo information are disposed on a disk surface in between data areas. Each servo burst contains track position information, track radial address fields and index information. Space division multiplexing of data and servo information minimizes track misregistration effects, since both data and servo information are reproduced from the same surface with a common head. The sector scheme is more efficient in a single disk applications, since more disk surface area is available for data storage.

Once a data track has been located it is important that the read/write head be kept on the center line of that track for accurate reading and writing operations. This positioning of the read/write head on the center line of a track is known as "track following." Variations from the center line of the track being followed produce a position error signal (PES) which is used to generate a corrective input to the head positioning apparatus to move the head back to the center line position.

Servo position information on either side of the center line of a data track are read and detected by the magnetic heads. A PES supplying data on the deviation of the magnetic head from the track center is detected by determining the amplitude difference of the two servo position signals. If this difference is zero, it is assumed that the head is precisely over the track. A positive or negative PES indicates that the head is off center in one direction or the other, and suitable correction signals are generated.

Almost all prior art performs the demodulation of PES signals by purely analog means. Analog methods are used even in files employing digital servo systems. The conversion of PES to the digital format is performed subsequent to PES demodulation, and is done at the sample rate of the servo.

One prior art method for implementing PES demodulation by digital means employs a peak detector built using a high speed analog to digital converter (ADC) and latch arrangement. This implementation, however, does not employ synchronous detection nor is it applicable to servo encoding schemes requiring coherent detection for their resolution.

With the advent of advanced large scale integration (LSI) technology, performing signal processing entirely in the digital domain has become increasingly desirable. The recognized advantages of digital implementations includes stability against component variation, absence of large numbers of passive support components, the ability to implement complex algorithms which cannot economically be implemented using analog techniques, and the ability to exploit the cost benefits conferred by large scale integration. A further advantage of digital PES detection is that the ADC and analog preamplification and variable gain control elements can be shared by both servo and a digital implementation of the recording channel.

FIG. 1 illustrates a prior art PES detection scheme using analog processing. In FIG. 1, sector servo data signal 10, which is reproduced from a rotating magnetic medium, is inputted into preamplifier 12. The output of preamplifier 12 is coupled to analog processing and automatic gain control (AGC) block 14. The output of block 14 is coupled to a block of multiple integrators 16, which are coupled to each other in parallel. Control switch 18 determines which integrator of block 16 is to be coupled to analog to digital converter 20. The digitized position error signa X1 is the resulting output signal from the analog to digital converter (ADC) 20.

In operation, the sector servo data is amplified by preamp 12 and provided to AGC 14. The AGC block 14 amplifies the sector signal to a desired level and delivers an output signal of constant amplitude, regardless of the amplitude of the input signal. The output of the AGC stage is provided to integrators 16A and 16B. The two integrators are drive by common synchronous carrier and conrol signals and are used to perform the synchronous detect and integrate function of the servo PES and AGC fields of the servo data. While one of the integrators is integrating servo data, the other is coupled through multiplexor switch 18 to digitizer 20.

This prior art method of FIG. 1 demodulates the PES from the composite analog sector servo data signals by purely analog means; all signal processing prior to ADC block 20 is performed using analog techniques. Thus, this prior art example suffers from the drawbacks of analog signal processing discussed above.

SUMMARY OF THE INVENTION

A sample data position error signal detection means is described. This invention has application in a digital sector or dedicated sample data servo in a magnetic media disk drive environment. In particular, the invention relates to the detection in digital form of position error signals (PES) representative of magnitude and sign of recording head displacement from a track center line. The circuits disclosed provide a digital representation of PES suitable for direct application to a digital signal processor which controls overall servo positioning operations. The invention detects the PES by employing a digital integrator which comprises a register and adder.

The composite servo data reproduced by the recording head from servo information pre-recorded on the magnetic disk is first amplified by variable gain amplifier and then undergoes low pass filtering before being coherently sample and digitized by a 10-bit analog to digital converter (ADC). The digital integration is performed by accumulating ADC samples in a register. Before being accumulated in the register, the sample servo data is multiplied by plus one or minus one, using an exclusive-OR gate cascade interposed between the ADC output and adder input. The multiplication of the sampled servo data by plus one or minus one is required for synchronous rectification. Upon completion of accumulaton of a prescribed number of ADC samples, the contents of the register are transferred to a temporary buffer pending interrogation by the servo controlled digital signal processor. Sufficient guard bits must be provided in the register to prevent overflow during accumulation of samples.

Coherent sampling of the composite servo signal and timing of ADC conversion and digital integration operations are governed by a phase lock loop (PLL). The PLL acquires lock to servo information in a synchronizing preamble which precedes servo position data. The function of the PLL is to provide clocking in the demodulator which is synchronous to the servo data being demodulated. Although the PLL employed in this invention is described as being of the analog type, it could equally be an all digital implementation. Possible implementations are described in the paper, "A Survey of Digital Phase-Locked Loops," (Lindsey, W. C. and Chie, C-M: Proc. IEEE Vol. 69, April 1981, Pgs. 410–431). An additional advantage of this invention is the provision of a temporary digital buffer means at the output of the demodulator to retain the results of the PES detection process until they are required by the DSP. Inclusion of the buffer permits rapid detection of servo information without need for continual intervention of the DSP processor. Although described in relation to a null type servo pattern embodiment, this invention can also be applied with, at most, slight modification to other patterns, including those of the differentially-encoded burst type.

Another advantage of the invention is that the circuit structure lends itself to efficient construction in integrated circuit form using bipolar and CMOS technology.

BRIEF DESCRIPTION OF THE DRAWINGS

FIGS. 3A–3C illustrate the preferred embodiment of the digital integrator element of the present invention.

FIGS. 5A–5C illustrate the demodulation of a null PES signal for full off-track and full on-track cases.

DETAILED DESCRIPTION OF THE PRESENT INVENTION

A sample data position error signal detection means for digital dedicated or sector servo applications is described. In the following description, numerous specific details, such as number of bits, etc., are described in detail in order to provide a more thorough description of this invention. It will be apparent, however, to one skilled in the art, that the present invention may be practiced without these specific details. In other instances, well known features have not been described so as not to obscure the present invention. It will also be apparent to one skilled in the art that the present invention could be practiced in a dedicated servo environment simply by recording the dedicated servo surface with a periodically sampled pattern.

The use of digital servo provides several advantages. Digital signal processing techniques allow use in the control algorithms of powerful state-space techniques, permit enhanced system adaptivity to plant parameter variation, and greatly reduce overall circuit complexity.

Figure 2:
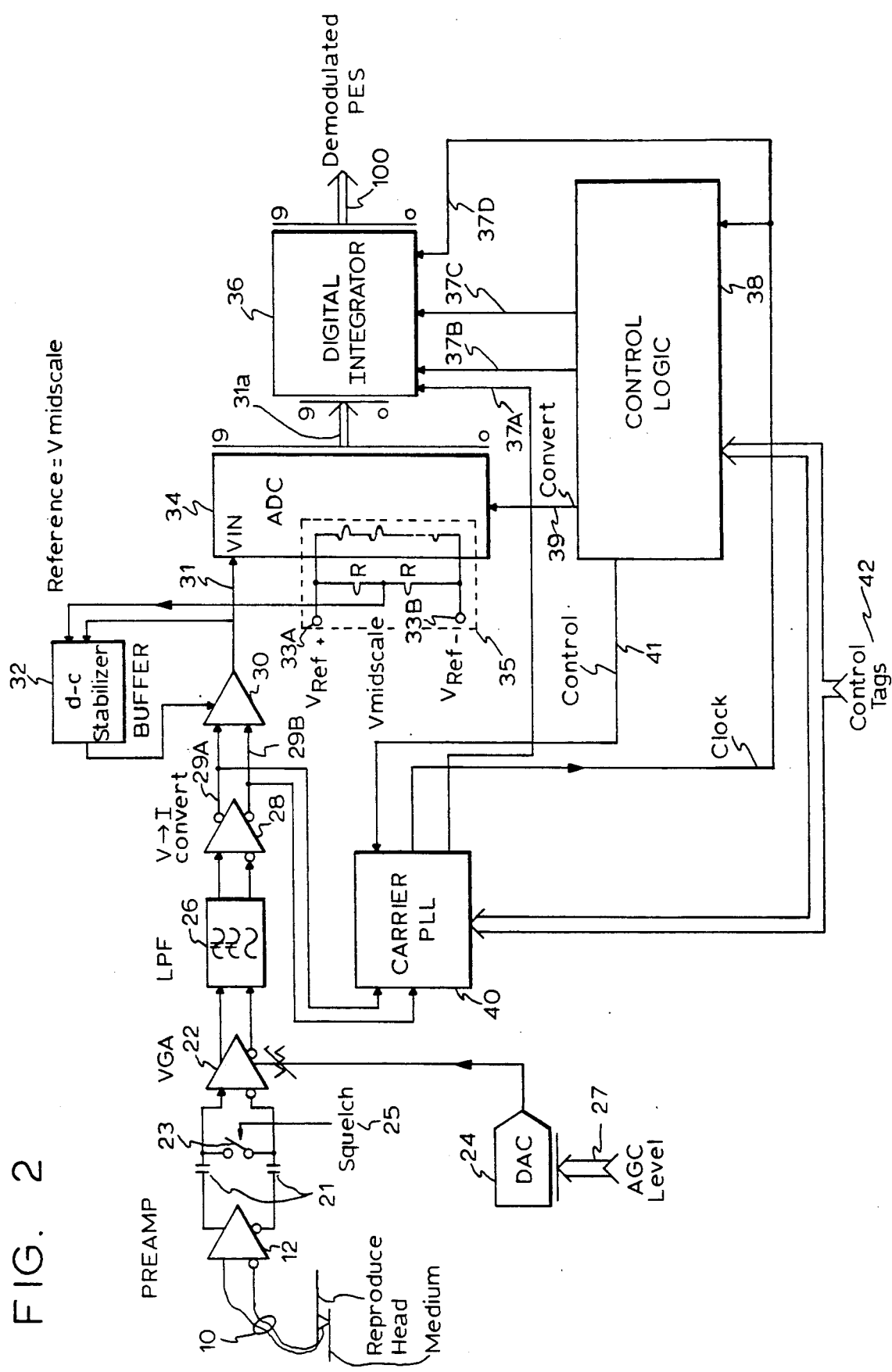
FIG. 2 is a block diagram illustrating the digital PES detector of the present invention.

FIG. 2 illustrates in simplified block form the structure of the PES detector of the present invention. In FIG. 2, reproduced analog servo data 10 is delivered to preamplifier 12. Preamplifier 12 is AC coupled to variable gain amplifier (VGA) 22 by capacitors 21. Squelch switch 23 is controlled by squelch signal 25 to establish DC equilibrium in coupling capacitors 21 following write or read switch operations. Note that switch 23 is required only when practicing the invention in a sector servo environment.

VGA 22 receives its gain control command input from a digital to analog converter (DAC) 24 to which, in turn, is applied over cable 27 the result of an automatic gain control (AGC) microcode routine operating in the servo control digital signal processor (DSP). This routine performs the AGC function by comparing the sampled and digitized amplitude of an AGC field in the servo burst to a fixed reference and integrating the resultant difference. The integrated difference is applied to DAC 24 over cable 27. The AGC field is reproduced invariant with head radial position. THe AGC field detection is identical to that of the PES detection and uses common circuits.

The differential voltage output from VGA 22 is applied to low pass filter 26. Differential voltage to current (V to 1) converter 28 receives a differential voltage input from low pass filter 26 and converts this input to balanced differential current signals 29A and 29B. Use of current mode signals avoids $V_{BE}$ stackup, and results in availability of increased voltage swings when the demodulator is powered by a single 12 or 5 volt supply, as is common in the disk drive industry. Differential current signals 29A and 29B are connected to carrier phase locked loop (PLL) block 40, and low-output-impedance buffer 30. The output of buffer 30 is connected to DC stabilizer 32. The mid-scale voltage level $V_{mid\text{-}scale}$ from voltage divider circuit 35 is also applied to DC stabilizer 32. DC stabilizer 32 regulates the DC level of the output of buffer 30 to the potential set by $V_{mid\text{-}scale}$, thus centering the input to the ADC in the conversion range. Divider circuit 35 is a voltage divider that is coupled to the analog to digital converter (ADC) 34 and sets the mid-scale voltage determined by the two fixed DC reference levels $V_{REF}+$ 33A and $V_{REF}-$ 33B. The output signal 31 from buffer 30 is connected to the input of "flash" ADC 34.

Reference levels $V_{REF}+$ and $V_{REF}-$ establish the full-scale range of ADC 34, and are generated by precision voltage reference circuits not shown in FIG. 2. Flash ADC 34 (10 bits in preferred embodiment) converts the analog composite servo signal 31 to digital form. The digital form of signal 31 is delivered on cable 31a. A conversion operation in ADC 34 is initiated by a pulse on Start Convert line 39. The 10-bit parallel output 31a of ADC 34 is applied to digital integrator 36 for further processing. Digital integrator 36 receives Carrier signal 37A and Clock signal 37D from Carrier PLL 40. Control. block 38 inputs Reset signal 37B and Sample signal 37C into digital integrator 36 as well as Convert signal 39 into ADC 34. Carrier PLL 40 is coupled to control logic block 38 by control signal 41. Control tags signals are delivered on cable 42 from servo control logic not shown, and applied to both control logic block 38 and carrier PLL 40. These tags perform such system functions as power-up, reset and mode selection. Digital integrator 36 outputs a resulting demodulated position error signal on cable 100 to the system servo control DSP. Control block 38 governs overall sequencing of the PES demodulation operation.

FIG. 3A is a block diagram illustrating a detailed view of the digital integrator of the present invention. IN FIG. 3A, an exclusive-OR gate 44 is interposed between ADC sample servo signal 31a and adder 46 of digital integrator 36. EXclusive-OR gate 44 cooperates with the carry input of adder 46 and is employed before inputting the sampled signal into adder 46 to multiply the sample servo signal 31a by a plus one or a minus one under control of the Carrier signal 37A generated in carrier PLL 40. Multiplication by alternate plus one and minus one achieves a synchronous rectification of the digitized sampled servo data received from ADC 34 on cable 31a. When the carrier signal is a binary zero, the sampled servo signal 31a is effectively multiplied by a plus one and when the carrier signal is a binary one, the signal on cable 31a is multiplied by a negative one. Negation is performed by taking the two's complement of data received on cable 31 from ADC 34. The two's complement of data received on cable 31 from ADC 34. The two's complement operation is achieved by complementing each bit of the signal 31a, then adding one to the complemented signal. The addition of one is done at the carry in input terminal of adder 46. The carrier signal is generated by control logic 38 and timed by PLO 40. The signals from exclusive-OR gate 44 are summed with output of register 48 in adder 46. The low-order Carry input of adder 46 is also controlled by carrier signal 37A. In adder 46, there exist "guard" bits, which accommodate overflow during sample accumulation in adder 46 and register 48. In the preferred embodiment of the digital integrator of the present invention, there are three "guard' bits. The resulting 13-bit output from adder 46 is inputted into register 48. It is apparent that jointly implement a digital integration (accumulation) function.

Figure 3B:
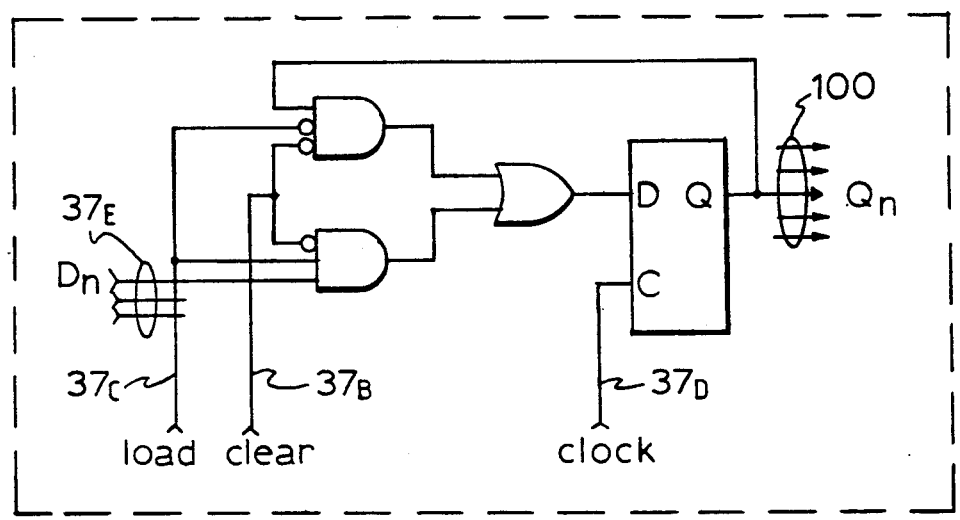

A more detailed view of one stage of synchronously loadable register 48 is illustrated in FIG. 3B. FIG. 3B illustrates how register 48 stores and outputs the desired demodulated position error signal based on the output of adder 46. Register 48 is comprised of AND/OR gates and one D/type flipflop. This is the preferred embodiment of the register of the presesnt invention. In operation, register 48 is reset synchronously to zero state when commanded by Clear signal 37B, prior to commencement of an integration cycle. If Load signal 37C is "on," then output signal $Q_n$ is simply the input signal $D_n$ which existed on the previous clock cycle. If Load signal 37C is "off" then output signal $Q_n$ is the previous output signal, $Q_{n-1}$, and the register holds its previous contents.

The output of register 48 is then fed back into adder 46 to be summed with the next servo signal sample received on cable 31a, after multiplication of the sample by plus or minus one. Upon completion of accumulation of a prescribed fixed number of samples, the contents of the register 48 are transferred to a temporary buffer, pending interrogation by the servo control DSP over cable 100, which carries the digital PES signal.

Figure 3C:
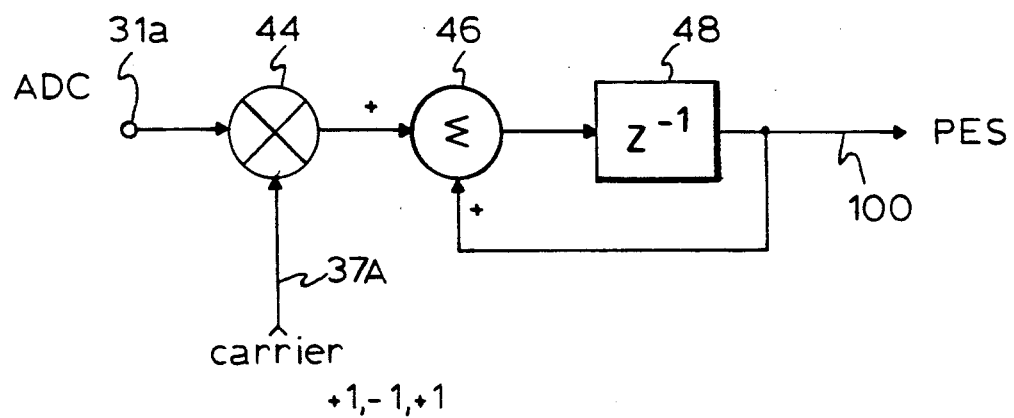

FIG. 3C illustrates a simplified diagram showing how the servo data is demodulated into the desired position error signal. ADC output 31a and carrier signal 37A are inputted into multiplier 44 which is coupled to adder 46. The output of adder 46 is then inputted into delay element 48 which is coupled in feedback fashion to adder 46. The resulting output from delay 48 is the position error signal. In this figure, the $Z^{-1}$ element represents the one sample period delay inherent in operation of register 48. As is known, integration improves PES signal-to-noncoherent-noise ratio by the square root of the number of samples integrated.

Figure 1:
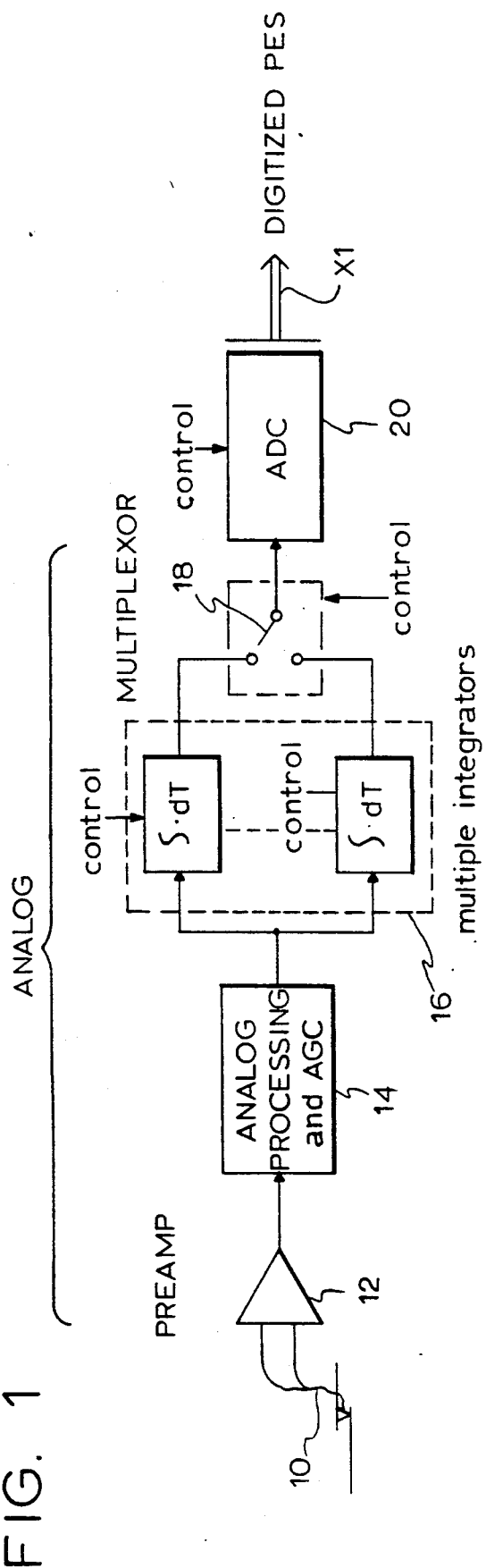
FIG. 1 is a block diagram illustrating a prior art method for PES detection.
Figure 4B:
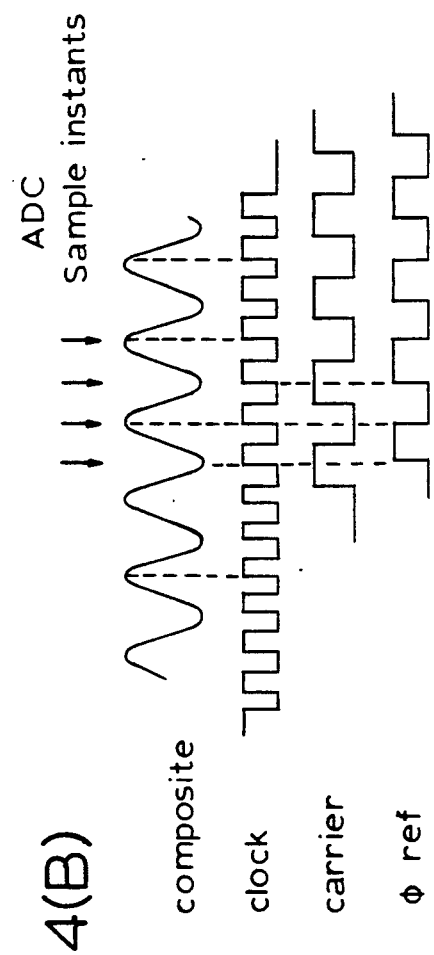
FIGS. 4A and 4B illustrate the preferred embodiment for the carrier PLL element of the present invention.
Figure 4A:
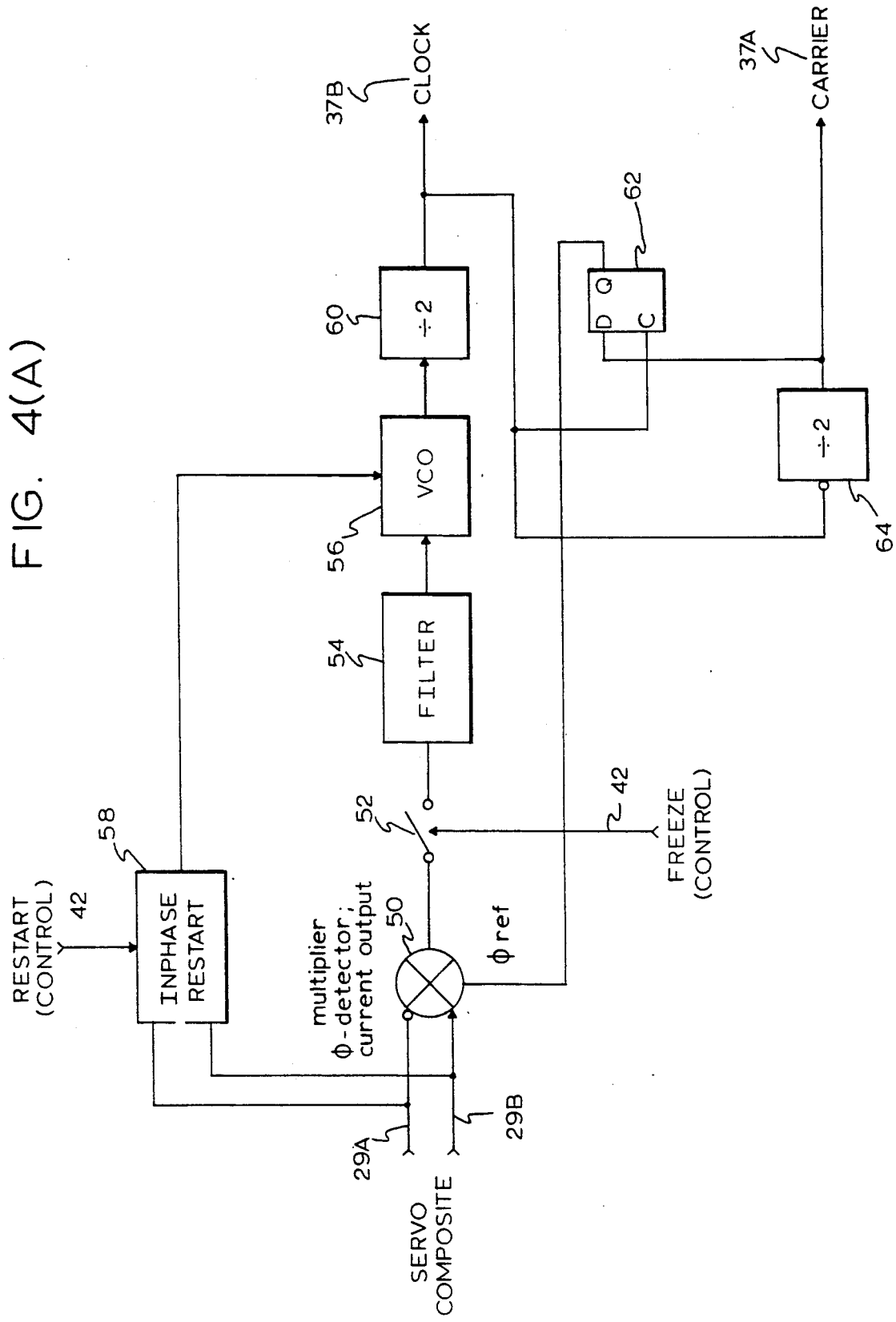

FIG. 4A illustrates a block diagram of the preferred embodiment for the carrier PLL element of the present invention. As noted earlier, this PLL could also be constructed solely of digital elements. In operation of carrier PLL 40, multiplier phase detector 50 receives differential current signals 29A and 29B, which represent the analog composite servo signal. Differential current signals 29A and 29B are also inputted into in-phase restart block 58. Analog multiplier phase detector 50 multiplies differential current signals 29A and 29B with the phase reference signal received from D-type flipflop 62. The output of multiplier phase detector 50 is passed through switch 52 before being inputted into loop filter 54. Both the output of loop filter 54 and the digital output of in-phase restart block 58 are inputted into voltage control oscillator (VCO) 56. The signal received from the loop filter regulates VCO phase to achieve phase lock to the composite input signal received on wires 29A and 29B.

The output of VCO 56 is inputted into a divider 60 which subsequently results in clock signal 37D. To obtain carrier signal 37A, clock signal 37D is inputted into divider 64. Clock signal 37D is the clock input to D-type flipflop 62, and carrier signal 37A is the input into D-type flipflop 62. Switch 52 suppresses influence of the phase detector 50 upon loop filter 54, during PES servo fields encoded according to a null format; this is necessary to avoid false correction of loop phase.

The function of the carrier PLL 40 is to provide clocking in the demodulator and sampling in ADC 34 which is synchronous to the servo data being demodulated. The phase lock loop generates a carrier of fixed frequency and phase used for synchronous detection of burst AGC and PES fields. The phase lock loop acquires phase lock in a constant frequency synchronizing field which precedes the encoded PES information. Once phase lock has been achieved, the analog phase detector is disabled by opening switch 52 for the duration of the PES encoding fields, allowing a precisely phased carrier to ontrol the burst demodulation process throughout the remainder of the servo data. Use of an analog phase detector yields good performance, even in the presence of drop-outs and noise arising from imperfections in the recording medium. Phase acquisition of the loop is improved in sector servo application by incorporating an in-phase restart capability in the VCO to reduce initial loop phase error when locking to the intermittently present servo burst synchronizing preamble. The in-phase restart circuit is unnecessary in dedicated servo applications when the synchronizing preamble occupies the entire region between servo bursts.

FIG. 4B illustrates four timing diagrams to show the timing relationships between the analog composite signal, the clock signal, the carrier signal and the phase reference signal. As can be seen from FIG. 4B, the phase reference timing pulses ($\phi$) are in quadrature to the composite analog signal. Also, the carrier timing pulse periods are twice as long as the clock period and this can be attributed to divider 64 of FIG. 4A. The phase reference timing signal is equivalent to the carrier signal, except for the phase shift, due to the fact that in-phase locked state, the multiplier phase detector 50 enforces a quadrature (90 degree) lock between its phase reference and composite signal inputs.

In the preferred embodiment of the present invention, a differentially-encoded servo PES burst pattern is used, where adjacent servo tracks are written with circumferentially offset and phase coherent bursts of transitions. Head displacement from the boundary of two adjoining servo tracks results in a differential change in burst amplitude; both bursts are of equal amplitude when the head is centered over the track boundary.

Because with the differential pattern, both bursts can be of identical phase, both with respect to each other and to the synchronizing preamble, inclusion of switch 52 in the servo PLO is not necessary. False phase correction in the PLL cannot now occur in the PES burst region since the signals reproduced therein can always be made phase-coherent with those reproduced in the synchronizing region.

Demodulation of a differentially encoded burst PES requires that carrier polarity be maintained fixed at one value throughout burst A, then reversed to the opposite value throughout burst B. This results in a PES value which is the difference of the integrals of bursts A and B.

In a null pattern encoding of servo PES information, with which this invention can also be practiced in an alternate embodiment, adjacent servo tracks are written with phase coherent but oppositely polarized magnetic transitions. Thus, the phase and amplitude of the reproduced servo signal are measures of servo reproduce head displacement from the boundary of two adjoining servo tracks. When the head is exactly centered over the boundary, transitions on adjoining tracks nominally cancel, yielding nominally zero head null output. Head offset from the centered position leads to a head output, the sign and magnitude of which are dependent, respectively, upon direction and extent of offset. Because of dependence of polarity on offset direction, switch 52 is included in the Pll to prevent potential false loop correction during PES bursts. FIGS. 5A-5C illustrates three examples of the demodulation of a null-PES signal which is shown therein as reproduced from the recording disk, as three instances of the composite signal present on wires 29A, 29B or 31. FIG. 5A illustrates a group of timing signals that relate to off-track "forward." FIG. 5B illustrates a group of timing signals attributed to off-track "reverse." The two figures show that the ADC output has sampled the composite null-pattern signal in quadrature and the multiplier rectifies the sampled ADC output either positively or negatively, based on whether the off-track is forward or reversed. The position error signal output is then shown incrementally to increase in magnitude away from the center line, either in forward or reverse. The carrier signal is shown to be synchronous with the composite null-pattern signal.

FIG. 5C shows an example of the output of the timing signals when the data head is "on track." In this case, there is no analog servo signal and therefore there is no ADC sampled output. Because of this, the position error signal output is zero, since there is no error signal to be measured.

Thus, a method for synchronous digital detection of position error signals is described.

I claim:

1. A circuit for detection of position error signals comprising:
    detection means for receiving a position error signal and providing a first and second output signal;
    stabilizing means coupled to said detection means for stabilizing said first and second output signal and providing a third output signal;
    converting means coupled to said stabilizing means for converting said third output signal to a fourth output signal;
    digital integrating means coupled to said converting means for integrating said fourth signal and providing a fifth output signal;
    synchronizing means coupled to said detection means and said digital integrating means for providing timing functions in said digital integrating mesns; and
    controlling means coupled to said synchronizing means, said converting means and said digital integrating means for providing control signals to said converting and digital integrating means.

2. The circuit of claim 1 wherein said detection means comprises a synchronous detection circuit.

3. The circuit of claim 1 wherein said stabilizing means comprises a buffer, DC stabilizer and regulator circuit from said converting means.

4. The circuit of claim 1 wherein said converting means comprises an analog to digital converter.

5. The circuit of claim 1 wherein said digital integrating means comprises an XOR adder and register.

6. The circuit of claim 1 wherein said synchronizing means is a carrier phase lock loop.

7. The circuit of claim 6 wherein said carrier phase lock loop is a digital phase lock loop.

8. A circuit for detection of position error signal comprising:
    a preamplifier receiving a servo signal providing a first and second output signal;
    first and second capacitors receiving said first and second output signals and providing a third and fourth output signal, respectively.;
    a squelching means coupled to said first and second capacitors;

a variable gain amplifier coupled to said squelching means as well as coupled to a digital to analog converter, providing a fifth and sixth output signal;

a low pass filter coupled to said variable gain and providing a seventh and eighth output signal;

a voltage-to-current converter coupled to said low pass filter for providing a ninth and tenth output signal;

a buffering means coupled to said voltage-to-current converter and coupled to a DC stabilizer in feedback fashion for providing an eleventh output signal;

a digital carrier phase lock loop coupled to said voltage-to-current converter for providing a twelfth and thirteenth output signal;

an analog-to-digital converter coupled to said buffering means for providing a fourteenth output signal;

a control logic means coupled to said carrier phase lock loop as well as said analog-to-digital converter and to said digital integrator for providing controlling signals;

a digital integrator coupled to said analog-to-digital converter for providing a fifteenth output signal.

* * * * *